United States Patent [19]

Le Deit

[11] Patent Number: 5,048,648
[45] Date of Patent: Sep. 17, 1991

[54] PISTON CAP

[75] Inventor: Gerard Le Deit, Courtry, France

[73] Assignee: Bendix France, Drancy, France

[21] Appl. No.: 639,741

[22] Filed: Jan. 11, 1991

Related U.S. Application Data

[63] Continuation of Ser. No. 416,818, Oct. 4, 1989, abandoned.

[30] Foreign Application Priority Data

Oct. 28, 1988 [FR] France ................. 88 14213

[51] Int. Cl.$^5$ ............................................. B60T 11/00
[52] U.S. Cl. ...................................... 188/370; 74/18.2;
92/98 D; 188/72.4; 277/29; 277/201; 277/212 FB
[58] Field of Search ............. 188/370, 72.4, 72.5, 188/71.1; 277/75, 76, 79, 201, 212 R, 212 FB, 215, 29; 74/18.2; 192/98 D

[56] References Cited

U.S. PATENT DOCUMENTS

| | | | |
|---|---|---|---|
| 2,977,138 | 3/1961 | Brittain, Jr. ................. | 277/75 X |
| 3,175,834 | 3/1965 | Wallace et al. .............. | 277/212 FB |
| 3,528,301 | 9/1970 | Wasmer ....................... | 277/212 X |
| 4,154,546 | 5/1979 | Merrick et al. ............. | 277/212 FB X |
| 4,327,925 | 5/1982 | Alexander et al. .......... | 277/212 FB |
| 4,921,258 | 5/1990 | Fournier et al. ............ | 277/215 X |

FOREIGN PATENT DOCUMENTS

| | | | |
|---|---|---|---|
| 2004501 | 8/1971 | Fed. Rep. of Germany ...... | 277/212 FB |
| 2254083 | 5/1973 | Fed. Rep. of Germany ...... | 277/215 |

Primary Examiner—George E. A. Halvosa
Attorney, Agent, or Firm—Larry J. Palguta; Ken C. Decker

[57] ABSTRACT

The present invention relates to a piston cap for a disc brake, comprising a brake motor consisting of a piston (24) sliding in a cylinder (26), this cap being composed of a flexible material ensuring sealing between the piston (24) and the cylinder (26) by way of a bead (32) located on its inner periphery and coming to rest in an annular groove (34) made in the head of the piston (2) and of a retention part on its outer periphery, capable of coming in contact with the inner wall of a receptacle formed at the end of the cylinder, this retention part comprising a metal insert (36) in the form of a cylindrical ring. According to the invention, the cap possesses at least one vent allowing the air contained in the volume which it delimits with the piston (24) and the cylinder (26) to escape and preventing the entry of foreign bodies or corrosive agents into this volume.

1 Claim, 1 Drawing Sheet

PISTON CAP

This is a continuation of abandoned application Ser. No. 07/416,818 filed Oct. 4, 1989.

BACKGROUND OF THE INVENTION

The present invention relates to piston caps and, more particularly, to piston caps intended for equipping disc brakes.

Such caps are well known in the art of disc brakes and are aimed at ensuring the sealing of the cylinder of the brake motor, in order to prevent the intrusion of foreign bodies or dirt which could impede the sliding of the piston of the brake motor during a braking action. Conventionally, these caps are fastened to the sliding piston on the one hand and to the caliper of the disc brake on the other hand and are made of flexible material so as to be capable of experiencing deformation during the movement of the piston.

It can happen that, during the mounting of the disc brake and, more particularly, during the installation of the piston in its cylinder and of the cap for ensuring sealing between them, a certain quantity of air is enclosed between these two components. During braking, it is well known that there is then an emission of heat which, if communicated to the piston of the brake motor, can cause the heating of this quantity of air and therefore its expansion and an increase of pressure in the volume delimited by the piston head, the cylinder and the cap. The piston cap, because it is made of flexible material, will then be forced to expand outwards, and if there is substantial heating it can then happen that the cap comes in contact with the support of the friction material, itself brought to a high temperature. The cap will then be damaged by being burnt in the zones of contact with the friction-material support, thus making it necessary to dismantle the brake completely in order to change the cap and restore the desired sealing.

SUMMARY OF THE INVENTION

It is therefore an object of the invention to provide a piston cap for a disc brake which, on the one hand, avoids enclosing too large a quantity of air in the volume delimited by the piston head and the cylinder during the mounting of the brake motor and, on the other hand, allows this air to escape from this volume during substantial braking actions giving rise to a general heating of the brake.

To achieve this, the present invention provides a piston cap for a disc brake, comprising a brake motor consisting of a piston sliding in a cylinder, this cap being composed of a flexible material ensuring sealing between the piston and the cylinder by means of a bead located on its inner periphery and coming to rest in an annular groove made in the head of the piston and of a retention part on its outer periphery, capable of coming in contact with the inner wall of a receptacle formed at the end of the cylinder, this retention part comprising a metal insert in the form of a cylindrical ring. The cap further comprises at least one vent allowing the air contained in the volume which it delimits with the piston and the cylinder to escape and preventing the entry of foreign bodies or corrosive agents into this volume.

BRIEF DESCRIPTION OF THE DRAWINGS

The invention will now be described by way of example with reference to the accompanying drawings in which.

DETAILED DESCRIPTION OF THE INVENTION

Figure 1:
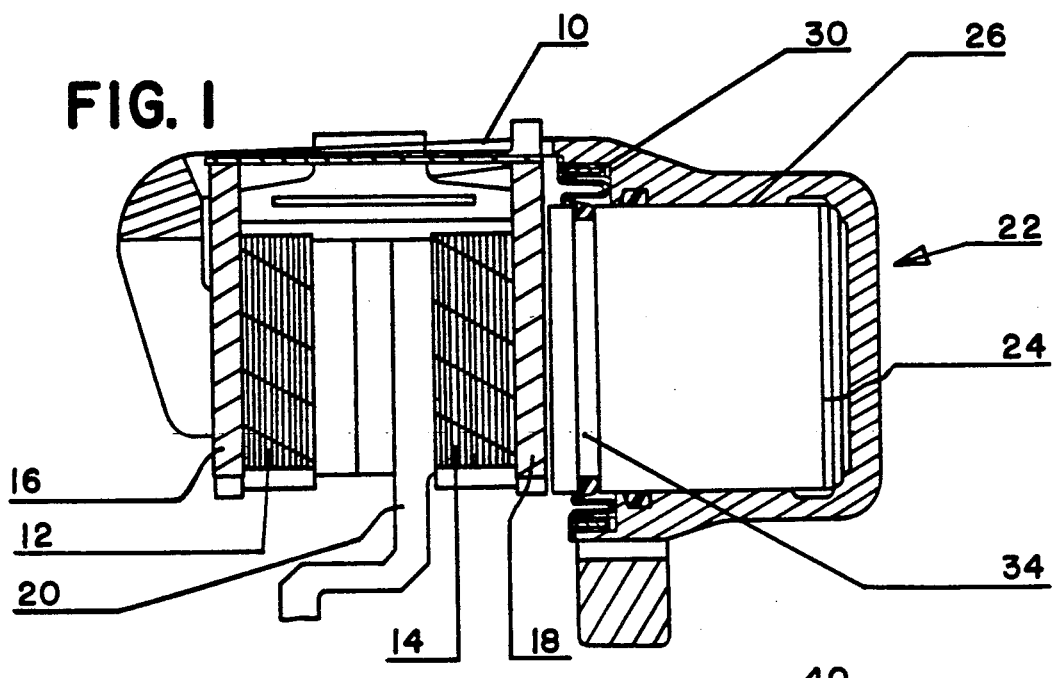
FIG. 1 is a sectional view of a disc brake incorporating a cap according to the present invention.
Figure 2:
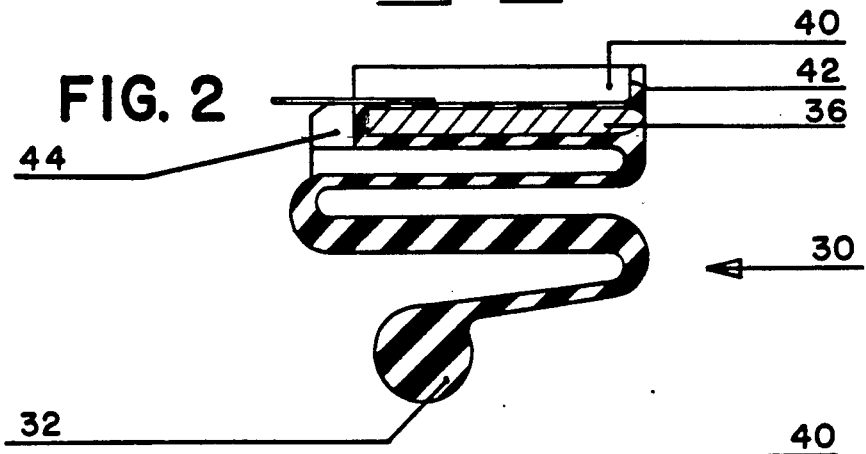
FIG. 2 is a sectional view of the cap of the invention in a plane passing through its axis.
Figure 3:
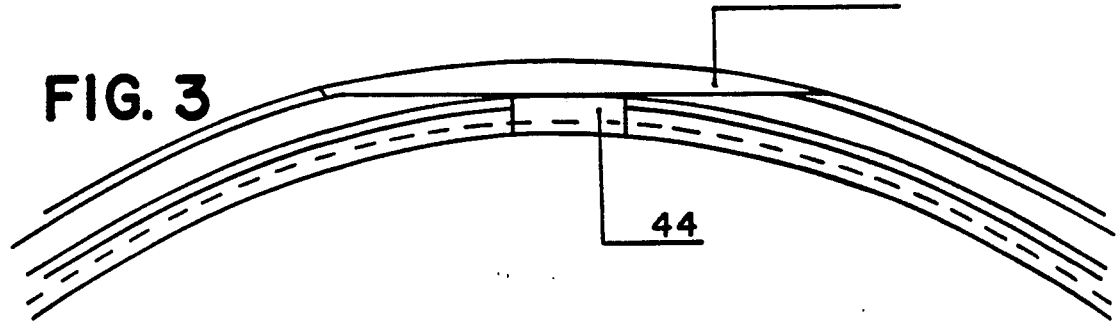
FIG. 3 is a view of the retention part of the cap of the invention in a plane perpendicular to its axis.
Figure 4:
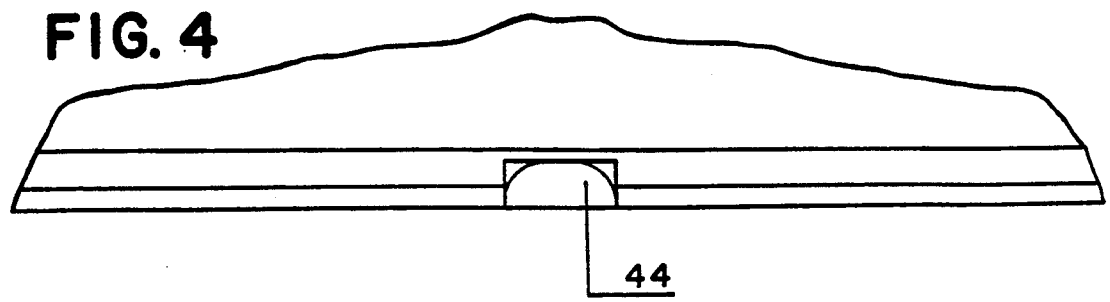
FIG. 4 is a side view of the cap of the invention.

FIG. 1 illustrates in a sectional view a disc brake of the type comprising a caliper 10, two friction members 12 and 14 equipped respectively with supporting plates 16 and 18 and capable of coming into frictional engagement with a rotary disc 20 during the actuation of a brake motor 22. This brake motor comprises a piston 24 sliding in a cylinder 26 in order to act on the supporting plate 18 of the friction member 14 during braking. A cap 30 made of flexible material ensures the sealing of the cylinder of the motor, to prevent any intrusion of foreign bodies or corrosive agents which can interfere with the sliding of the piston 24, and it is retained, on the one hand, on the piston 24 by means of a bead 32 located on its inner periphery and coming to rest in an annular groove 34 made in the head of the piston and, on the other hand, at the edge of the orifice of the cylinder 26 by means of its outer peripheral part forming a retention part.

The retention part of the cap 30 comprises a metal insert 36 forming a cylindrical ring which lays the outer edge of the cap against the inner wall of its receptacle consisting of a bore of a diameter larger than that of the cylinder 24 and located at the end of the latter. Sealing is then ensured in a known way between the piston 24 and the cylinder 26.

According to the invention, means are provided to ensure the escape of the air which could be enclosed in the receptacle of the cap during the mounting of the latter, while at the same time preventing foreign bodies or corrosive agents from intruding into this receptacle. Thus, localized thinned portions 40 are formed in the retention part of the cap over most of the height of the outer periphery of the retention part and parallel to the axis of the cap, so as to leave a tongue 42 at that end of the retention part located furthest outside the receptacle of the cap. At the same time, according to the invention, notches 44 are made on that edge of the retention part intended to come up against the bottom of the cap receptacle and in the zones where these thinned portions have been formed.

Thus, during the installation of the cap in its receptacle round the piston 24, the excess air in this receptacle will find a passage through the notches 44 and the space located between the thinned portions 40 of the retention part of the cap and the inner wall of the cap receptacle. If this air is subjected to excessive pressure during mounting or during overheating of the brake, it can then lift the tongue 42, acting in the manner of a valve or a vent, and escape outwards.

In contrast, since the cap is force-fitted into its receptacle by means of the metal insert 36, the tongue 42 will preserve a slight inclination towards the outside of the receptacle. Thus, the entry of foreign bodies or corrosive agents into the receptacle of the cap will be prevented.

It will therefore be appreciated that, as a result of the invention, during a heating of the brake the excess air in the cap receptacle will be able to find a path outwards and will no longer force the cap to swell until it comes in contact with the support 18 of the friction material which could burn it and damage it.

Although the thinned portions 40 have been described and illustrated as flattened portions, it is clear that they can be given the form and extent which is deemed expedient. The same applies to the notches 44. The number of thinned portions 40 at the periphery of the retention part of the cap is not critical. It shall be selected according to the diameter of the piston, so as to provide a sufficient passage to allow the excess air to escape, without detriment to the rigidity of the retention part.

Moreover, although vents made in the outer periphery of the retention part have been disclosed, it is obvious that a skilled man would provide such vents at the inner periphery and make at least one notch in the bead 32 for that purpose without departing from the scope of the invention.

What we claim is:

1. A piston cap for a disc brake comprising a brake motor having a piston sliding in a cylinder, said cap comprising a flexible nonmetallic material ensuring sealing between the piston and cylinder by means of a bead located at an inner periphery and for coming to rest in an annular groove in a head of the piston and of a retention part on an outer periphery and capable of coming into contact with an inner wall of a receptacle formed at an end of the cylinder, said retention part comprising an encapsulated metal insert in the form of a cylindrical ring, and portions of at least one vent path allowing the escape of air contained in a volume which the cap delimits with the piston and cylinder, the cap also preventing the entry of foreign bodies and corrosive agents into said volume, the vent path comprising a thinned portion of the retention part over most of the height of the outer periphery of only said nonmetallic material, the thinned portion communicating with both a flexible radial tongue of the flexible nonmetallic material adjacent one end of the metal insert and located axially away from a bottom of the receptacle and with a radial notch in an edge of the retention part intended to come up against the bottom of the receptacle and at a zone where the thinned portion has been formed, so that air can escape along the vent path through the radial notch, thinned portion, and flexible radial tongue.

* * * * *